(12) United States Patent
Hoenig et al.

(10) Patent No.: US 10,941,596 B2
(45) Date of Patent: Mar. 9, 2021

(54) BEARING, HINGE ASSEMBLIES, AND METHOD OF MAKING AND USING THE SAME

(71) Applicant: SAINT-GOBAIN PERFORMANCE PLASTICS PAMPUS GMBH, Willich (DE)

(72) Inventors: Kathrin Hoenig, Schwalmtal (DE); Lukas Plioska, Viersen (DE); Hans-Juergen Jaeger, Huerth (DE)

(73) Assignee: SAINT-GOBAIN PERFORMANCE PLASTICS PAMPUS GMBH, Willich (DE)

(*) Notice: Subject to any disclaimer, the term of this patent is extended or adjusted under 35 U.S.C. 154(b) by 136 days.

(21) Appl. No.: 16/140,624

(22) Filed: Sep. 25, 2018

(65) Prior Publication Data

US 2019/0093401 A1 Mar. 28, 2019

Related U.S. Application Data

(60) Provisional application No. 62/563,164, filed on Sep. 26, 2017.

(51) Int. Cl.
*E05D 3/02* (2006.01)
*F16C 17/10* (2006.01)
(Continued)

(52) U.S. Cl.
CPC .............. *E05D 3/02* (2013.01); *E05D 5/14* (2013.01); *F16C 11/04* (2013.01); *F16C 11/12* (2013.01);
(Continued)

(58) Field of Classification Search
CPC ....... E05D 3/02; E05D 5/14; E05D 2005/145; E05D 2700/04; F16C 11/04; F16C 11/12;
(Continued)

(56) References Cited

U.S. PATENT DOCUMENTS

| 545,800 A | 9/1895 | Kempshall |
| 3,177,559 A | 4/1965 | Boschi et al. |

(Continued)

FOREIGN PATENT DOCUMENTS

| DE | 2818014 A1 * 11/1979 | ............... E05D 5/14 |
| DE | 102011077728 A1 * 12/2012 | ............ F16C 33/588 |

(Continued)

OTHER PUBLICATIONS

International Search Report and Written Opinion for PCT/EP2018/075911, dated Nov. 21, 2018, 13 pages.

*Primary Examiner* — William L Miller
(74) *Attorney, Agent, or Firm* — Abel Schillinger, LLP; Chi Suk Kim

(57) ABSTRACT

A bearing including a substrate and a low friction layer, where the bearing includes an annular shape including a radial bearing portion in the form of an axially-extending base region, and an axial bearing portion in the form of a radially-extending flange, where the axial bearing portion terminates in a deep drawn axially extending lip, and at least one of a radial coining region or an axial coining region, where the radial coining region is positioned along the radially-extending flange and forms an annular depression, where the axial coining region is positioned along the axially-extending base region, and where the axial coining region is deformed so as to be non-parallel to a longitudinal axis of the bearing.

19 Claims, 3 Drawing Sheets

(51) Int. Cl.
*F16C 33/20* (2006.01)
*F16C 11/04* (2006.01)
*F16C 11/12* (2006.01)
*F16C 31/02* (2006.01)
*E05D 5/14* (2006.01)

(52) U.S. Cl.
CPC .............. *F16C 17/10* (2013.01); *F16C 31/02* (2013.01); *F16C 33/203* (2013.01); *F16C 33/208* (2013.01); E05D 2005/145 (2013.01); E05D 2700/04 (2013.01); E05Y 2201/628 (2013.01); E05Y 2900/50 (2013.01); E05Y 2900/55 (2013.01); F16C 2202/06 (2013.01); F16C 2202/30 (2013.01); F16C 2202/32 (2013.01); F16C 2208/30 (2013.01); F16C 2208/36 (2013.01); F16C 2220/42 (2013.01); F16C 2240/12 (2013.01); F16C 2240/60 (2013.01); F16C 2240/70 (2013.01); F16C 2326/01 (2013.01); F16C 2350/54 (2013.01); Y10T 16/537 (2015.01)

(58) Field of Classification Search
CPC ........ F16C 17/10; F16C 31/02; F16C 33/203; F16C 33/208; F16C 2202/30; F16C 2202/32; F16C 2208/30; F16C 2208/36; F16C 2220/42; F16C 2240/12; F16C 2240/60; F16C 2240/70; F16C 2326/01; F16C 2350/54; E05Y 2201/628; E05Y 2900/50; E05Y 2900/55; Y10T 16/537; Y10T 16/05
USPC ........... 16/273, 2.1; 384/107, 100, 275, 276, 384/420; 310/90
See application file for complete search history.

(56) References Cited

U.S. PATENT DOCUMENTS

| | | | | |
|---|---|---|---|---|
| 3,921,225 A | * | 11/1975 | Suska | E05D 3/02 16/273 |
| 3,957,939 A | | 5/1976 | Voaden | |
| 4,116,019 A | * | 9/1978 | Welschof | F16C 33/7809 464/131 |
| 4,721,406 A | * | 1/1988 | Davis | E05D 11/081 16/273 |
| 5,075,928 A | * | 12/1991 | Bobrowski | E05D 5/06 16/273 |
| 5,112,146 A | | 5/1992 | Stangeland | |
| 5,273,369 A | | 12/1993 | Strobl | |
| 5,385,413 A | | 1/1995 | Murphy et al. | |
| 5,906,029 A | * | 5/1999 | Fox | F16C 11/02 16/221 |
| 6,164,830 A | * | 12/2000 | Nitzsche | F16C 23/045 384/203 |
| 6,376,952 B1 | | 4/2002 | Stenta | |
| 6,669,370 B1 | * | 12/2003 | Storch | F16C 17/10 384/129 |
| 8,984,817 B2 | | 3/2015 | Weiden et al. | |
| 9,022,656 B2 | | 5/2015 | Burgeff et al. | |
| 2009/0224618 A1 | | 9/2009 | Bhatti | |
| 2011/0002565 A1 | * | 1/2011 | Ambroise | F16C 17/10 384/222 |
| 2011/0150375 A1 | | 6/2011 | Jaeger et al. | |
| 2012/0005859 A1 | * | 1/2012 | Herglotz | E05D 7/0415 16/241 |
| 2012/0106882 A1 | * | 5/2012 | Ponnouradjou | B32B 7/12 384/297 |
| 2012/0240350 A1 | * | 9/2012 | Natu | E05D 5/14 16/2.2 |
| 2013/0067689 A1 | * | 3/2013 | Mitchell | E05D 5/04 16/382 |
| 2015/0285306 A1 | * | 10/2015 | Akyol | F16C 33/6614 384/473 |
| 2017/0002858 A1 | * | 1/2017 | Hunter | F16C 33/046 |
| 2019/0360521 A1 | * | 11/2019 | Schmidt | F16C 17/10 |

FOREIGN PATENT DOCUMENTS

| | | |
|---|---|---|
| EP | 1582275 B1 | 5/2007 |
| EP | 2058536 A1 | 5/2009 |
| GB | 2237059 A | 4/1991 |

* cited by examiner

BEARING, HINGE ASSEMBLIES, AND METHOD OF MAKING AND USING THE SAME

CROSS-REFERENCE TO RELATED APPLICATION(S)

This application claims priority under 35 U.S.C. § 119(e) to U.S. Patent Application No. 62/563,164 entitled "BEARING, HINGE ASSEMBLIES, AND METHOD OF MAKING AND USING THE SAME," by Kathrin HOENIG et al., filed Sep. 26, 2017, which is assigned to the current assignee hereof and incorporated herein by reference in its entirety.

FIELD OF THE DISCLOSURE

The invention relates in general to bearings that are located between moving parts and, in particular, to improved hinge assemblies and method of making and using the same for a bearing with modified geometry.

BACKGROUND

Bearings control movement between parts that move relative to each other, such as rotating shafts in housing bores used in for example hinge assemblies. One type of bearing is plane bearing located in the gap between the outer surface of a shaft and the inner surface of a bore. A specific type of plane bearing is a sliding bearing where sliding friction is generated either due to relative longitudinal sliding or rotational movement between components. This bearing may limit radial or axial motion of the shaft within the bore while still permitting relative movement.

In conventional bearing configurations, a close fit is sought between the inner and outer members. In addition, either forces for providing minimal variation in sliding forces are sought. A close fit between the components is desirable because it reduces relative vibration between the parts. Thus, bearings are able to compensate for tolerances or misalignments, create torque and can improve other properties, such as noise, vibration and harshness (NVH) properties.

Hinge assemblies often use bearings to provide for rotation between parts. These hinge assemblies sometimes include a coating including, but not limited to, paint coatings that may be done through e-painting or other methods. In some areas, the bearing and other components in the hinge assembly may include gaps that may lead to over coating which results in corrosion and debris/contamination in the hinge assembly. Although these solutions are workable for some applications, improvements in bearings continue to be of interest.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical embodiments.

DESCRIPTION OF THE DRAWINGS

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application. Reference to ranges The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing arts.

Figure 1:
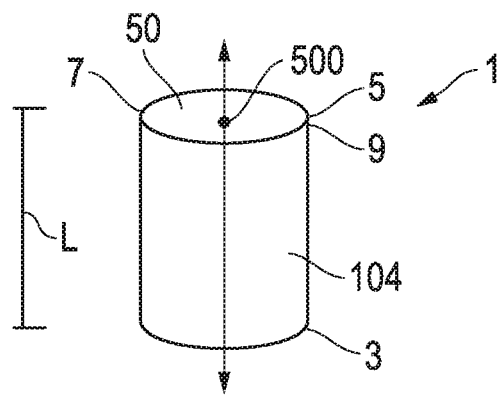
FIG. 1 illustrates a side view of a cylindrical bearing according to a number of embodiments.
Figure 2:
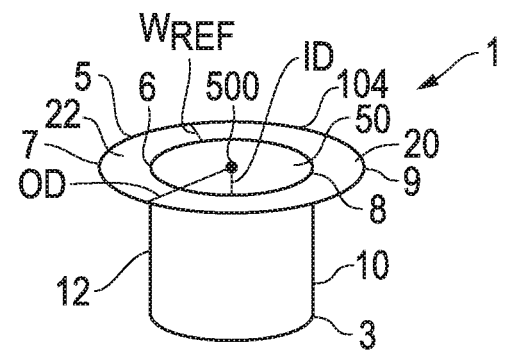
FIG. 2 illustrates a side view of a formed or flanged bearing according to a number of embodiments.

Embodiments of a bearing, a hinge assembly, and methods of making and using the same are disclosed in FIGS. 1-6. FIG. 1 illustrates a bearing or bushing 1 in accordance with a number of embodiments. In a number of embodiments, the bearing may be a plain bearing. In a number of embodiments, the bearing may be a sliding bearing. The bearing 1 may extend in the axial direction relative to a central axis 500. The central axis 500 may be longitudinal down the length of the bearing. The bearing 1 may include a sidewall 104 forming an annular shape having a first axial end or edge 3 and a second axial end or edge 5. The bearing may have a first outer radial end or edge 7 and a second outer radial end or edge 9. In a number of embodiments, the bearing 1 may have a non-planar shape. The bearing 1 may have an annular shape that is substantially L shaped. In other words, the bearing 1 may have an L bearing cross-section extending in the radial and axial direction as shown in FIG. 2. Other annular shapes of the bearing are possible. In a number of embodiments, the bearing 1 shown in FIG. 1 may be produced by rolling of an appropriately dimensioned piece of bearing composite which may be initially present as flat material. The opposite ends of a rolled piece of material may be bound at a slit or gap that runs in the axial direction down the bearing 1. Slits running in any nonlinear fashion and/or obliquely to the axis 500 of symmetry of the bushing 1 are also possible. The slit may be welded or otherwise coupled by other means to form the bearing 1. Still referring to FIG. 1, the bearing 1 may include a bore 50. The bore 50 may run down the axial length of the bearing 1 and be adapted to couple to another component of a hinge assembly 2. The bore 50 may be parallel or planar to the central axis 500. The bore 50 formation may comprise forming shaped holes in the sheet by perforating or stamping. The fabricating of geometrical formations into the sheet may be accomplished by coining, forming or deep drawing waves, balls or cones to form the sheet profile. In a number of embodiments, the L-shape bearing 1 may be achieved by a deep-drawing process involving stamping a formed bearing 2 (as shown in FIG. 2). The encapsulating step may be performed in the sheet profile in the low friction material by calendaring or laminating through the apertures in the sheet. The sheet may be formed into a substrate having radial inner and outer surfaces. A low friction material may encapsulate the substrate such that at least one of the radial inner and outer surfaces of the bearing may be located within the low friction material.

Referring now to FIG. 2, the bearing 1 may include a radial bearing portion 10. The radial bearing portion 10 may be in the form of an axially extending base region 12. The radial bearing portion 10 may extend from the first axial end 3 to the second axial end 5. The radial bearing portion 10 may be on the sidewall 104 of the bearing 1. The bearing 1 may further include an axial bearing portion 20. The axial bearing portion 20 may be on the sidewall 104 of the bearing 1. The axial bearing portion 20 may be in the form of a radially extending flange 22. The axial bearing portion 20 or radially extending flange 22 may extend from the first radial end 7 to the second radial end 9. In a number of embodiments, the bore 50 may divide the axial bearing portion 20 in the radial direction by providing a first inner radial end or edge 6 and a second inner radial end or edge 8 defining the edges of the bore 50 within the bearing 1. In a number of embodiments, at least one of the first outer radial end 7 or second outer radial end 9 may form the outer diameter OD of the bearing 1 when measured radially from the central axis 500. In a number of embodiments, at least one of the first inner radial end 6 or second inner radial end 8 may form the inner diameter ID of the bearing 1 when measured radially from the central axis 500. In other words, the radial width of the radially extending flange 22 $W_{REF}$ may be the distance from the difference in distance of the outer diameter OD and the inner diameter ID.

In a number of embodiments, the bearing 1 can have a thickness, T, and T can be ≥0.1 mm, such as ≥0.25 mm, ≥0.5 mm, ≥1 mm, ≥1.5 mm, ≥2 mm, or ≥2.5 mm. In another aspect, T can be ≤2.0 mm, ≤1.5 mm, ≤1 mm, ≤0.5 mm, ≤0.25 mm, or ≤0.1 mm.

In a number of embodiments, the bearing 1 may have an overall outer diameter, OD, from a first outer radial end 7 to a second outer radial end 9, and OD can be ≥0.5 mm, such as ≥1 mm, ≥5 mm, ≥10 mm, ≥15 mm, or ≥20 mm. The OD can be ≤35 mm, such as ≤30 mm, ≤20 mm, ≤15 mm, ≤10 mm, or ≤5 mm.

In a number of embodiments, the bearing 1 may have an overall inner diameter, ID, from a first inner radial end 6 to a second inner radial end 8, and ID can be ≥1 mm, such as ≥5 mm, ≥7.5 mm, ≥10 mm, ≥15 mm, or ≥20 mm. The ID can be ≤20 mm, such as ≤15 mm, ≤10 mm, ≤7.5 mm, ≤5 mm, or ≤1 mm.

In a number of embodiments, the bearing 1 can have an overall length, L from first axial end 3 to the second axial end 5, and L can be ≥0.5 mm, ≥0.75 mm, ≥1 mm, ≥2 mm, ≥5 mm, or ≥10 mm. L can be ≤10 mm, such as ≤7.5 mm, ≤5 mm, ≤2.5 mm, or ≤1 mm.

Figure 3:
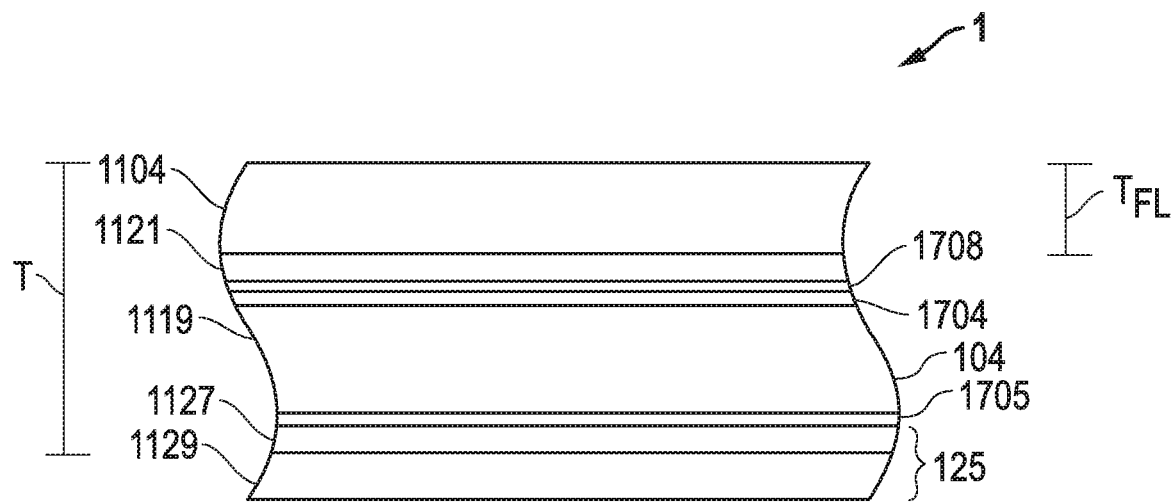
FIG. 3 illustrates a cross-sectional view of a material of a bearing according to a number of embodiments.

In a number of embodiments, as shown in FIG. 3, the bearing 1 can include a composite material. In a number of embodiments, the bearing 1 may include a substrate 1119. In a number of embodiments, the substrate may include a metal strip 1119. In a number of embodiments, the bearing 1 may include a low friction layer 1104. The low friction layer 1104 can be coupled to at least a portion of the metal strip 1119. In a particular embodiment, the low friction layer 1104 can be coupled to a surface of the metal strip 1119 so as to form a low friction interface with another surface of another component. In a particular embodiment, the low friction layer 1104 can be coupled to the radially inner surface of the metal strip 1119 so as to form a low friction interface with another surface of another component. In a particular embodiment, the low friction layer 1104 can be coupled to the radially outer surface of the metal strip 1119 so as to form a low friction interface with another surface of another component (such as an inner member 30 or outer member 40).

In an embodiment, the substrate or metal strip 1119 can at least partially include a metal. The metal may include aluminum, zinc, copper, magnesium, tin, platinum, titanium, tungsten, lead, iron, bronze, alloys thereof, or may be another type. More particularly, the substrate or metal strip 1119 can at least partially include a steel, such as a stainless steel or spring steel. For example, the substrate can at least partially include a 301 stainless steel. The 301 stainless steel may be annealed, ¼ hard, ½ hard, ¾ hard, or full hard. The metal strip 1119 may include a woven mesh or an expanded metal grid. Alternatively, the woven mesh can be a woven polymer mesh. In an alternate embodiment, the metal strip 1119 may not include a mesh or grid. In another alternate embodiment, the metal strip 1119, as a solid component, woven mesh or expanded metal grid, may be embedded between at least one adhesive layer 1121 included between the low friction layer 1104 and the metal strip 1119. In at least one embodiment, the metal strip 1119 may be any kind of metal alloy which provides an elastic behavior under application load in an arcuate shape.

Optionally, the bearing 1 may include at least one adhesive layer 1121 that may couple the low friction layer 1103 to the metal strip 1119. The adhesive layer 1121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns.

Optionally, the metal strip 1119 may be coated with corrosion protection layers 1704 and 1705 to prevent corrosion of the bearing 1 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

Optionally, the bearing 1 may further include a corrosion resistant coating 1125. The corrosion resistant coating 1125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In a number of embodiments, the low friction layer 1104 of the bearing 1 can comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction layer 1104 can have a thickness $T_{FL}$ in a range of 0.01 mm and 1.5 mm, such as in a range of 0.15 mm and 1.35 mm, or even in a range of 0.2 mm and 1.25 mm. In an embodiment, the thickness of the low friction 1104 may be uniform, i.e., a thickness at a first location of the low friction layer 1104 can be equal to a thickness at a second location therealong. In an embodiment, the bearing 1 may include a metal strip 1119, which may be formed with the low friction layer 1104 at the outer side 109 of the sidewall 104. In an embodiment, the bearing 1 may include a metal strip 1119, may be formed with the low friction layer 1104 on the inner side 107 of the sidewall 104. In a number of embodiments, the metal strip 1119 may extend at least partially along a length of the bearing 1. The metal strip 1119 may be at least partially encapsulated by the low friction or low friction layer 1104. That is, the low friction or low friction layer 1104 may cover at least a portion of the metal strip 1119. Axial ends of the metal strip 1119 may or may not be exposed from the low friction or low friction layer 1104. In a particular embodiment, the metal strip 1119 may be fully encapsulated in the low friction or low friction layer 1104 such that the metal strip 1119 may not be visibly perceptible. In another embodiment, the metal strip 1119 may include an aperture extending at least partially into the low friction or low friction layer 1104. The aperture can generally reduce stiffness of the bearing 1, thereby allowing a specific engineered stiffness profile.

In an embodiment, any of the layers on the bearing 1, as described above, can each be disposed in a roll and peeled therefrom to join together under pressure, at elevated temperatures (hot or cold pressed or rolled), by an adhesive, or by any combination thereof. In a number of embodiments, any of the layers of the bearing 1, as described above, may be laminated together such that they at least partially overlap one another. In a number of embodiments, any of the layers on the bearing 1, as described above, may be applied together using coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the metal strip 1119. In another embodiment, the low friction layer 1104 may be cast or molded.

In other embodiments, any of the layers on the bearing 1, as described above, may be applied by a coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the substrate or metal strip 1119. In another embodiment, the low friction layer 1104 may be cast or molded.

By way of a non-limiting example, the bearing 1 can be shaped in a jig. As stated above, in this regard, a strip of resilient material can be bent on the jig at desired locations to form bent portions. The strip of resilient material can comprise the substrate 1119 including a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. In a non-limiting embodiment, the strip of resilient material can additionally, or alternatively, include a low friction layer 1104 including a polymer, or a polymer coating disposed on the resilient material or substrate. In a number of embodiments, alternative materials can be used along the circumference of the bearing 1. In other words, the buckled regions 35, the unformed regions 119, and the wave structure regions 130 may each comprise different materials or compositions of the materials listed above at various locations circumferentially, radially, or axially about the bearing 1.

FIGS. 4A-4D illustrate the bearing 1 according to a number of embodiments. In a number of embodiments, the axial bearing portion 20 or radially extending flange 22 may terminate in at least one deep drawn axially extending lip 24. The deep drawn axially extending lip 24 may be disposed around the entirety of the outer radial ends 7, 9, of the bearing 1, or in other words, extend along the circumference of the axial bearing portion 20 or radially extending flange 22. The axially extending lip 24 may have a length $L_{AEL}$. The length $L_{AEL}$ may have a relationship with the length L of the bearing 1 such that $L_{AEL} \geq 0.3$ L, such as $\geq 0.25$ L, $\geq 0.20$ L, $\geq 0.15$ L, $\geq 0.10$ L, or $\geq 0.05$ L. In another aspect, length $L_{AEL}$ can be $\leq 0.5$ L, such as $\leq 0.45$ L, $\leq 0.40$ L, $\leq 0.35$ L, $\leq 0.30$ L, $\leq 0.25$ L, $\leq 0.20$ L, $\leq 0.15$ L, $\leq 0.10$ L, or $\leq 0.05$ L. The length $L_{AEL}$ of the axially extending lip 24 may vary along the circumference of the bearing 1 about the central axis 500.

In a number of embodiments, as shown in FIGS. 4A-4D, the axial bearing portion 20 or radial bearing portion 10 may include at least one radial coining region 26 which may be oriented in the axial direction. The at least one radial coining region 26 may provide more stiffness for the axial bearing portion 20 or radial bearing portion 10. In a number of embodiments, the radial coining region 26 may be adapted to provide a spring force between the inner member 30 and the outer member 40. In a number of embodiments, the radial coining region 26 may provide radial tolerance compensation for at least one of the axial bearing portion 20 or radial bearing portion 10, or fixation of the bearing 1 with at least one of the inner member 30 or outer member 40. The radial coining region 26 may include at least one undulation, depression, groove, trough, plateau, or projection in the radial direction. The radial coining region 26 may have a circular, polygonal, oval, or semi-circular cross-sectional shape. In one embodiment, the radial coining region 26 may be in the shape of a "U" in an axial direction. In a number of embodiments, the radial coining region 26 may be located on the radially extending flange 22. In a number of embodiments, the radial coining region 26 forms an annular depression in the radially extending flange 22. The radial coining region 26 may be disposed in the radial distance between the inner radial ends 6, 8 and at least one of the outer radial ends 7, 9, of the axial bearing portion 20 or radially extending flange 22 of the bearing 1. In other words, the radial coining region 26 may extend anywhere along the circumference of the axial bearing portion 20 or radially extending flange 22. The radial coining region 26 may have a length $L_{RCR}$. The length $L_{RCR}$ may have a relationship with the length L of the bearing 1 such that $L_{AEL} \geq 0.75$ L, such as $\geq 0.5$ L, $\geq 0.25$ L, $\geq 0.20$ L, $\geq 0.15$ L, $\geq 0.10$ L, or $\geq 0.05$ L. In another aspect, length $L_{AEL}$ can be $\leq 1$ L, such as $\leq 0.75$ L, $\leq 0.5$ L, $\leq 0.45$ L, $\leq 0.40$ L, $\leq 0.35$ L, $\leq 0.30$ L, $\leq 0.25$ L, $\leq 0.20$ L, $\leq 0.15$ L, $\leq 0.10$ L, or $\leq 0.05$ L. The length $L_{RCR}$ of the radial coining region 26 may vary along the circumference of the bearing 1 about the central axis 500. The radial coining region 26 may have a width $W_{RCR}$. The width $W_{RCR}$ may have a relationship with the width $W_{REF}$ of the bearing 1 such that width $W_{RCR} \geq 1$ $W_{REF}$, such as $\geq 0.75$ $W_{REF}$, $\geq 0.5$ $W_{REF}$, $\geq 0.25$ $W_{REF}$, $\geq 0.20$ $W_{REF}$, $\geq 0.15$ $W_{REF}$, $\geq 0.10$ $W_{REF}$, or $\geq 0.05$ $W_{REF}$. In another aspect, width $W_{RCR}$ can be $\leq 1$ $W_{REF}$, such as $\leq 0.75$ $W_{REF}$, $\leq 0.5$ $W_{REF}$, $\leq 0.45$ $W_{REF}$, $\leq 0.40$ $W_{REF}$, $\leq 0.35$ $W_{REF}$, $\leq 0.30$ $W_{REF}$, $\leq 0.25$ $W_{REF}$, $\leq 0.20$ $W_{REF}$, $\leq 0.15$ $W_{REF}$, $\leq 0.10$ $W_{REF}$, or $\leq 0.05$ $W_{REF}$. The width $W_{RCR}$ of the radial coining region 26 may vary along the circumference of the bearing 1 about the central axis 500. In a number of embodiments, the radial coining region 26 may be made of a material having a Young's modulus of no greater than 200 GPa, such as no greater than 100 GPa, no greater than 50 GPa, no greater than 100 GPa, no greater than 50 GPa, no greater than 25 GPa, no greater than 10 GPa, no greater than 1 GPa, or even no greater than 0.5 GPa. In a number of embodiments, the radial coining region 26 may be made of a material having a Young's modulus of no less than 0.5 GPa, such as no less than 1 GPa, no less than 10 GPa, no less than 25 GPa, no less than 50 GPa, no less than 100 GPa, or even no less than 200 GPa. In a number of embodiments, the radial coining region 26 may be adapted to provide the axial bearing portion 20 with a Young's modulus in these values.

Figure 4A:
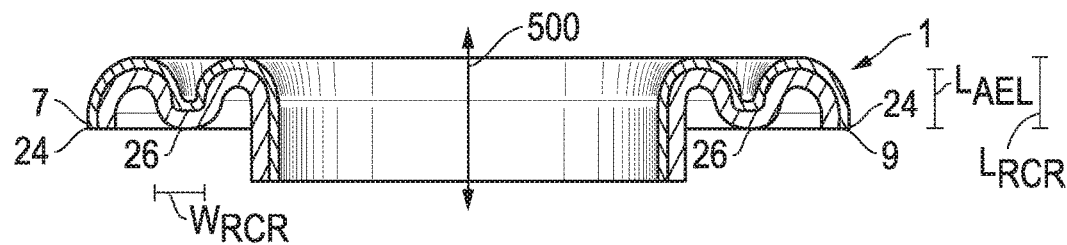
FIG. 4A illustrates a sectional side view of a bearing according to a number of embodiments.
Figure 4B:
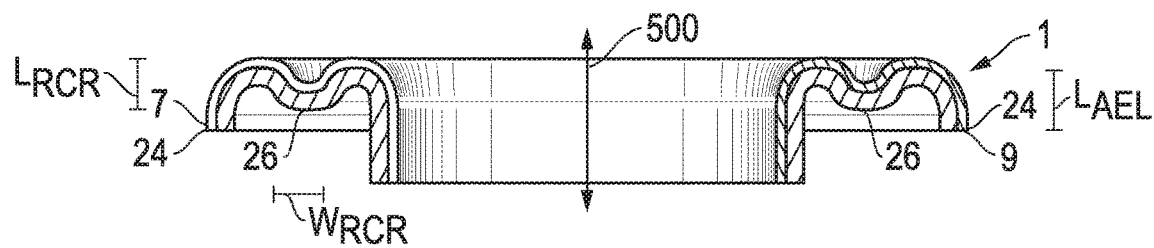
FIG. 4B illustrates a sectional side view of a bearing according to a number of embodiments.
Figure 4C:
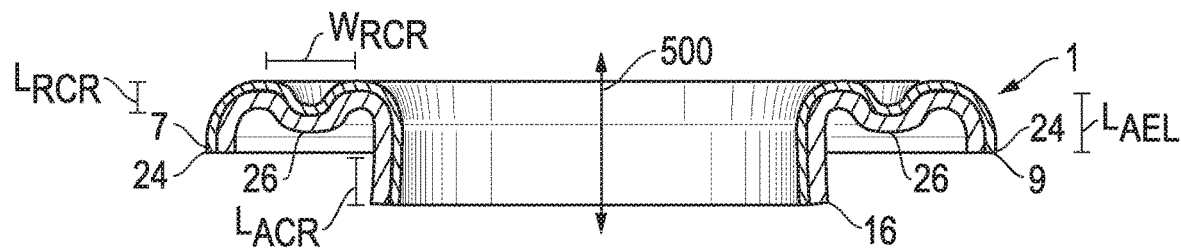
FIG. 4C illustrates a sectional side view of a bearing according to a number of embodiments.
Figure 4D:
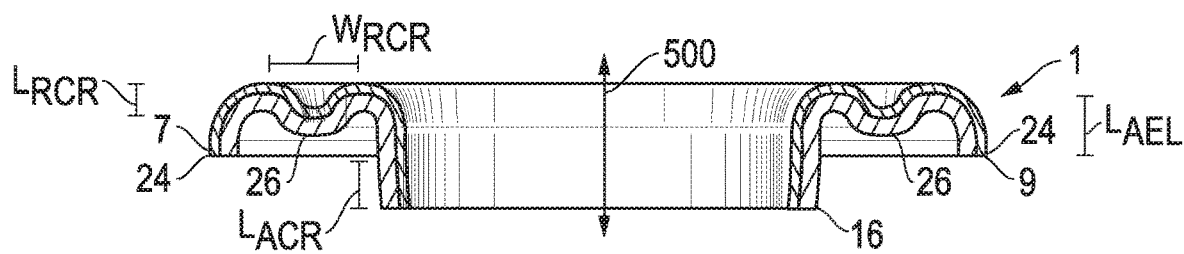
FIG. 4D illustrates a sectional side view of a bearing according to a number of embodiments.

In a number of embodiments, as shown in FIGS. 4A-4D, the axial bearing portion 20 or radial bearing portion 10 may include at least one axial coining region 16 which may be oriented in the radial direction. The at least one axial coining region 16 may provide more stiffness for the axial bearing portion 20 or radial bearing portion 10. In a number of embodiments, the axial coining region 16 may be adapted to provide a compressive force between the inner member 30 and the outer member 40. In a number of embodiments, the axial coining region 16 may provide axial tolerance compensation and stiffness support for at least one of the axial bearing portion 20 or radial bearing portion 10. The axial coining region 16 may include at least one undulation, depression, groove, trough, plateau, ramp, projection, or deformation in the axial direction. The axial coining region 16 may have a circular, polygonal, oval, or semi-circular cross-sectional shape. In a number of embodiments, the axial coining region 16 may be located on the radial bearing portion 10. In a number of embodiments, the axial coining region 16 may be disposed in the axial distance between the first axial end 3 and the second axial end 5. In other words, the axial coining region 16 may extend anywhere along the circumference of the radial bearing portion 10. In one embodiment, the axial coining region 16 may be in the shape of a deformation in a radial direction so the sidewall 104 may be non-parallel to a longitudinal axis or central axis 500 of the bearing 1 as shown in FIGS. 4C-4D. As shown in FIG. 4C, the axial coining region 16 may be deformed radially outward from a line parallel to the longitudinal or central axis 500. As shown in FIG. 4D, the axial coining region 16 may be deformed radially inward from a line parallel to the longitudinal or central axis 500. The radial coining region 26 may have a length $L_{ACR}$. The length $L_{ACR}$ may have a relationship with the length L of the bearing 1 such that $L_{ACR} \geq 0.3$ L, such as $\geq 0.25$ L, $\geq 0.20$ L, $\geq 0.15$ L, $\geq 0.10$ L, or $\geq 0.05$ L. In another aspect, length $L_{ACR}$ can be $\leq 0.5$ L, such as $\leq 0.45$ L, $\leq 0.40$ L, $\leq 0.35$ L, $\leq 0.30$ L, $\leq 0.25$ L, $\leq 0.20$ L, $\leq 0.15$ L, $\leq 0.10$ L, or $\leq 0.05$ L. The length $L_{ACR}$ of the axial coining region 16 may vary along the circumference of the bearing 1 about the central axis 500. In a number of embodiments, the axial coining region 16 may be made of a material having a Young's modulus of no greater than 200 GPa, such as no greater than 100 GPa, no greater than 50 GPa, no greater than 100 GPa, no greater than 50 GPa, no greater than 25 GPa, no greater than 10 GPa, no greater than 1 GPa, or even no greater than 0.5 GPa. In a number of embodiments, the axial coining region 16 may be made of a material having a Young's modulus of no less than 0.5 GPa, such as no less than 1 GPa, no less than 10 GPa, no less than 25 GPa, no less than 50 GPa, no less than 100 GPa, or even no less than 200 GPa. In a number of embodiments, the axial coining region 16 may be adapted to provide the radial bearing portion 10 with a Young's modulus in these values.

Figure 5:
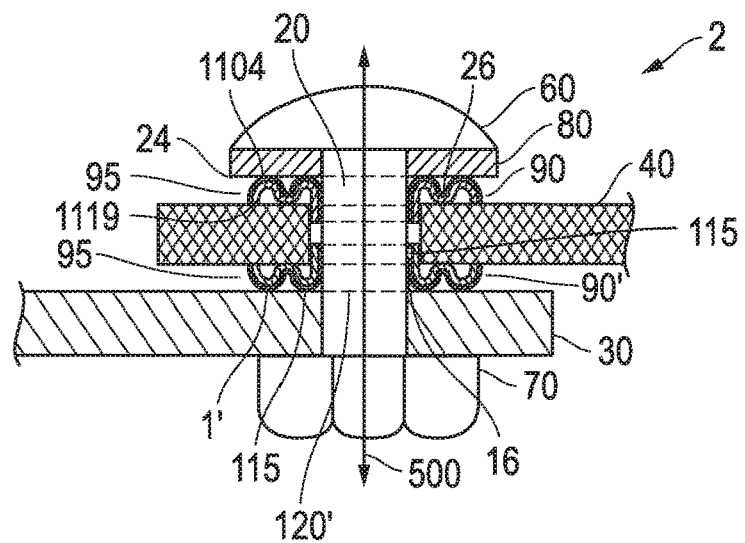
FIG. 5 illustrates a sectional side view of a hinge assembly according to a number of embodiments.

FIG. 5 illustrates a hinge assembly 2 according to a number of embodiments. In a number of embodiments, the bearing 1 may be included in the hinge assembly 2. In a number of embodiments, a plurality of bearings 1 may be included in the hinge assembly 2, including a first bearing 1 and a second bearing 1'. In a number of embodiments, multiple L-shaped bearings 1, 1' may be used oriented in different directions. As shown in FIG. 5, multiple L-shaped bearings 1, 1' may be oriented opposite each other along their shared bore 50 so as to be mirror images in the radial and axial direction. The resulting combined bearing 1, 1' may form an annular shape of a "U" bearing cross-section extending in the radial and axial direction as shown in the hinge assembly 2 of FIG. 5. In a number of embodiments, the hinge assembly 2 may include an inner member 30. In a number of embodiments, the inner member 30 may be, for example, a hinge body part. In a number of embodiments, the hinge assembly 2 may include an outer member 40. In a number of embodiments, the outer member 40 may be, for example, a hinge door part. In a number of embodiments, the inner member 30 may move relative to the outer member 40. In a number of embodiments, the outer member 40 may move relative to the inner member 30. In a number of embodiments, the hinge member 2 may include a rivet or rivet head 60. In a number of embodiments, the rivet 60 may be disposed within the bore 50 of the bearing 1. In a number of embodiments, the rivet 60 may bridge the inner member 30 with the outer member 40. In a number of variations, the rivet 60 may be tightened with inner member 30 through a set screw 70 and hold in place with the outer member 40 through washer 80. In a number of embodiments, at least one of the washer 80 or the rivet 60 may each be formed and manufactured according to known techniques in the bearing arts. In a number of embodiments, at least one of the washer 80 or the rivet 60 may be formed of a metal or polymeric material.

Figure 6:
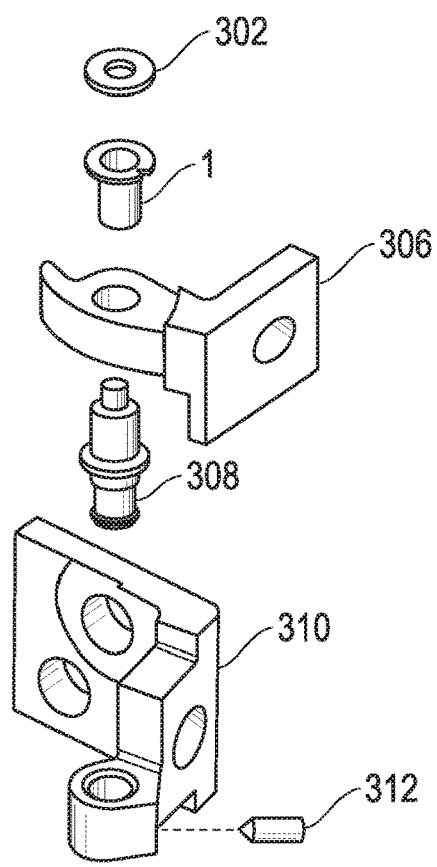
FIG. 6 illustrates a unassembled cut-away view of a hinge assembly according to a number of embodiments.

FIG. 6 depicts a non-limiting example of an embodiment of a hinge assembly 2 including the parts of a disassembled automobile door hinge including bearing 1, as depicted in FIGS. 1-2. FIG. 6 is an example of a profile hinge. A stamped hinge could also be used as an embodiment using the hinge assembly 2. The bearing 1 may be inserted in hinge door part 306. Rivet 308 bridges the hinge door part 306 with hinge body part 310. Rivet 308 may be tightened with hinge body part 310 through set screw 312 and hold in place with the hinge door part 306 through washer 302.

In a number of embodiments, as stated above, at least one of the first bearing 1 or the second bearing 1' may include a substrate 1119 and a low friction layer 1104. In a number of embodiments, as stated above, the low friction layer 1104 may be electrically insulating. Electrically insulating may be defined herein as having an electrical resistance of at least $1 \times 10^8$ Ohm/cm² or higher. In a number of embodiments, referring back to FIG. 5, at least one of the first bearing 1 or the second bearing 1' may include a radial bearing portion 10 in the form of an axially extending base region 12, and an axial bearing portion 20 in the form of a radially extending flange 22. In a number of embodiments, at least one of the first bearing 1 or the second bearing 1' may include a radial coining region 26 or an axial coining region 16 as shown. In a number of embodiments, as shown in FIG. 5. at least one of the first bearing 1 or the second bearing 1' may include a deep drawn axially extending lip 24 adapted to provide a fixed axial gap 90, 90' between the inner member 30 and the outer member 40, and/or between the outer member 40 and the washer 80. In a number of embodiments, the low friction layer 1104 on the deep drawn axially extending lip 24 may provide a radial outer surface that may be electrically insulating. As a result, during coating processes of the hinge assembly 2, over coating of the fixed axial gap 90, 90' will not occur, lessening the debris/contamination and/or corrosion in the fixed axial gaps 90, 90'. In a number of embodiments, the low friction layer 1104 on the deep drawn axially extending lip 24 may complete fill a gap between the outer member 40 and the inner member 30.

In a number of embodiments, the coating process may include a painting process such as an e-painting process. The coating process may provide a coating 95 deposited on an exterior surface of at least one component of the hinge assembly 2 (e.g., bearing 1, inner member 30, outer member 40, rivet 60, set screw 70, washer 80). In a number of embodiments, the deep drawn axially extending lip 24 with the low friction layer 1104 may allow for no paint to stick between the inner member 30 and the outer member 40 in the fixed axial gaps 90, 90' on each radial side of the hinge assembly 2 as it will not stick to the low friction layer 1104 on the deep drawn axially extending lip 24.

In a number of embodiments, at least one of the radial bearing portion 10 or the axial bearing portion 20 of the bearing 1 may include at least one notched region 115. The notched region 115 may be free of the low friction layer 1104. In other words, the notched region 115 may only include the substrate 1119 or metal strip. The notched region 115 may allow for conductivity between the bearing 1 and one of the other components of the hinge assembly 2. This may provide better coverage of the coating 95 with no paint bridges over the fixed axial gaps 90, 90'. In some embodiments, the notched region 115 may be a gap, edge, aperture, or groove in the bearing 1. The notched region 115 can be located anywhere on the bearing 1.

In still other embodiments, a method of forming a bearing 1 comprises providing a sheet formed from a metallic material or substrate 1119; contacting the sheet profile in a low friction material 1104; and forming the sheet profile into an annular shape to form a bearing 1. The method may further comprise, disposing the bearing 1 relative to an inner member 30 and an outer member 40 to form a hinge assembly 2.

In an embodiment, the assembly 1 can be installed or assembled by an assembly force of at least 10 N in a longitudinal direction relative to the inner member or outer member, such as at least 50 N, at least 100 N, at least 500 N, at least 1,000 N, at least 5,000 N, or even at least 10,000 N. In a further embodiment, the torque assembly 1 can be installed or assembled by an assembly force of no greater than 10,000 N in a longitudinal direction to the inner member or outer member, such as no greater than 5,000 N, no greater than 1,000 N, no greater than 500 N, no greater than 100 N, no greater than 50 or even no greater than 10 N.

Various embodiments disclosed here can have significant advantages over conventional solutions. Notably, the use of the bearing 1 within the hinge assembly 2 may reduce or eliminate over-coating of paint in gap areas or paint bridges, and debris/contamination in those gap areas of the hinge assembly 2, which may lead to corrosion. Further, use of a low friction layer (and/or its electrically insulating properties) on the bearing 1 may significantly decouple the two mating members that may be connected by the bearing 1 without diminishing other areas of performance. Further, the axial coining region 16 and/or radial coining region 26 may provide axial or radial tolerance compensation and stiffness support for the bearing 1 within the hinge assembly 2. As a result, these designs can significantly reduce noise, harshness, and vibration (NVH) properties.

Bearings of various embodiments may further provide sliding force control (e.g., axial or rotational) when used between mating components. Further, this design enables bearings to be designed to operate on a higher torque level for sliding bearing applications, and over wider clearances with higher radial load strength and lower sliding forces than are possible with conventional bearings.

Applications for such embodiments include, for example, hinge assemblies 2 for portable electronics such as laptop computers and cellular telephones. Further, use of the bearing 1 or hinge assembly 2 may provide increased benefits in several applications such as, but not limited to, vehicle tail gates, door frames, seat assemblies, or other types of applications. These applications require hinge mechanisms that provide a low retention force at a well-defined torque over the lifetime of the product. Traditional bearings may provide an initial retention force and initial torque within a desired range. However, according to embodiments herein, torque values may be maintained over the product lifetime.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Many different aspects and embodiments are possible. Some of those aspects and embodiments are described below. After reading this specification, skilled artisans will appreciate that those aspects and embodiments are only illustrative and do not limit the scope of the present invention.

Embodiment 1

A bearing comprising: a substrate and a low friction layer, wherein the bearing comprises an annular shape comprising: a radial bearing portion in the form of an axially-extending base region, and an axial bearing portion in the form of a radially-extending flange, wherein the axial bearing portion terminates in a deep drawn axially extending lip, and at least one of a radial coining region or an axial coining region, wherein the radial coining region is positioned along the radially-extending flange and forms an annular depression, wherein the axial coining region is positioned along the axially-extending base region, and wherein the axial coining region is deformed so as to be non-parallel to a longitudinal axis of the bearing.

Embodiment 2

A hinge assembly comprising: an inner member; at least one outer member; and at least one of a first bearing or a second bearing, the at least one of a first bearing or a second bearing comprising: a substrate and a low friction layer, wherein the bearing comprises an annular shape comprising: a radial bearing portion in the form of an axially-extending base region, and an axial bearing portion in the form of a radially-extending flange, wherein the axial bearing portion terminates in a deep drawn axially extending lip adapted to provide a fixed axial gap between the inner member and the outer member, wherein the lip comprises a radial outer surface that is electrically insulating.

Embodiment 3

The bearing or hinge assembly of any of the preceding embodiments, wherein the bearing comprises a radial coining region.

Embodiment 4

The bearing or hinge assembly of any of the preceding embodiments, wherein the bearing comprises an axial coining region.

Embodiment 5

The bearing or hinge assembly of embodiment 4, wherein the axial coining region is deformed radially outward.

Embodiment 6

The bearing or hinge assembly of embodiment 4, wherein the axial coining region is deformed radially inward.

Embodiment 7

The hinge assembly of embodiment 2, wherein the radial coining region is adapted to provide an axial compressive force between the inner member and the outer member.

Embodiment 8

The hinge assembly of embodiment 2, wherein the axial coining region is adapted to provide a spring force between the inner member and the outer member.

Embodiment 9

The hinge assembly of embodiment 2, further comprising a washer engaged with a surface of the bearing.

Embodiment 10

The hinge assembly of embodiment 2, further comprising a rivet engaged with a surface of the bearing.

Embodiment 11

The hinge assembly of embodiment 10, further comprising a set screw engaged with the rivet.

Embodiment 12

The bearing or hinge assembly of any of the preceding embodiments, wherein the bearing annular shape is substantially L-shaped.

Embodiment 13

The bearing or hinge assembly of any of the preceding embodiments, wherein the low friction layer comprises a polymer.

Embodiment 14

The bearing or hinge assembly of any of the preceding embodiments, wherein the low friction layer comprises a fluoropolymer.

Embodiment 15

The bearing or hinge assembly of any of the preceding embodiments, wherein the low friction layer has an electrical resistance of at least $1 \times 10^8$ Ohm/cm$^2$ Embodiment 16

The bearing or hinge assembly of any of the preceding embodiments, wherein at least one of the radial bearing portion or the axial bearing portion comprises a notched region free of the low friction layer.

Embodiment 17

The hinge assembly of embodiment 2, wherein the radial coining region is adapted to provide the axial bearing portion with a Young's modulus of between about 0.5 and 200 GPa.

Embodiment 18

The hinge assembly of embodiment 2, wherein the axial coining region is adapted to provide the radial bearing portion with a Young's modulus of between about 0.5 and 200 GPa.

Embodiment 19

The hinge assembly of embodiment 2, wherein the hinge assembly is a component of a vehicle.

Embodiment 20

The hinge assembly of embodiment 2, wherein the low friction layer has a thickness of about 0.1 to about 1.5 mm.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing comprising:
a substrate and a low friction layer, wherein the bearing comprises an annular shape comprising:
   a radial bearing portion in the form of an axially-extending base region, and
   an axial bearing portion in the form of a radially-extending flange, wherein the axial bearing portion terminates in a deep drawn axially extending lip, and a radial coining region positioned along the radially-extending flange and
forming annular undulations, wherein the lip comprises a radial outer surface that is electrically insulating.

2. The bearing of claim 1, wherein the bearing comprises an axial coining region.

3. The bearing of claim 2, wherein the axial coining region is deformed radially outward.

4. The bearing of claim 2, wherein the axial coining region is deformed radially inward.

5. The bearing of claim 1, wherein the bearing annular shape is substantially L-shaped.

6. The bearing of claim 1, wherein the low friction layer comprises a polymer.

7. The bearing of claim 1, wherein the low friction layer comprises a fluoropolymer.

8. The bearing of claim 1, wherein the low friction layer has an electrical resistance of at least 1×108 Ohm/cm2.

9. The bearing of claim 1, wherein at least one of the radial bearing portion or the axial bearing portion comprises a notched region free of the low friction layer.

10. A hinge assembly comprising:
an inner member;
at least one outer member; and
at least one of a first bearing or a second bearing, the at least one of a first bearing or a second bearing comprising:
   a substrate and a low friction layer, wherein the bearing comprises an annular shape comprising:
      a radial bearing portion in the form of an axially-extending base region, and
      an axial bearing portion in the form of a radially-extending flange, wherein the axial bearing portion terminates in a deep drawn axially extending lip adapted to provide a fixed axial gap between the inner member and the outer member, and a radial coining region positioned along the radially-extending flange and forming annular undulations, wherein the lip comprises a radial outer surface that is electrically insulating.

11. The hinge assembly of claim 10, wherein the radial coining region of at least one of the first bearing or the second bearing is adapted to provide an axial compressive force between the inner member and the outer member.

12. The hinge assembly of claim 10, wherein at least one of the first bearing or the second bearing comprises an axial coining region that is adapted to provide a spring force between the inner member and the outer member.

13. The hinge assembly of claim 10, further comprising a washer engaged with a surface of the bearing.

14. The hinge assembly of claim 10, further comprising a rivet engaged with a surface of the bearing.

15. The hinge assembly of claim 14, further comprising a set screw engaged with the rivet.

16. The hinge assembly of claim 10, wherein the radial coining region is adapted to provide the axial bearing portion with a Young's modulus of between about 0.5 and 200 GPa.

17. The hinge assembly of claim 10, wherein the axial coining region is adapted to provide the radial bearing portion with a Young's modulus of between about 0.5 and 200 GPa.

18. The hinge assembly of claim 10, wherein the hinge assembly is a component of a vehicle.

19. The hinge assembly of claim 10, wherein the low friction layer has a thickness of about 0.1 to about 1.5 mm.

* * * * *